United States Patent
Weir et al.

(10) Patent No.: US 9,657,536 B2
(45) Date of Patent: May 23, 2017

(54) METHOD AND APPARATUS FOR CONNECTING TUBULARS OF A WELLSITE

(75) Inventors: James William Weir, Houston, TX (US); Frank Benjamin Springett, Spring, TX (US)

(73) Assignee: National Oilwell Varco, L.P., Houston, TX (US)

( * ) Notice: Subject to any disclaimer, the term of this patent is extended or adjusted under 35 U.S.C. 154(b) by 365 days.

(21) Appl. No.: 14/232,890

(22) PCT Filed: Jul. 9, 2012

(86) PCT No.: PCT/US2012/045984
§ 371 (c)(1),
(2), (4) Date: Jan. 14, 2014

(87) PCT Pub. No.: WO2013/022541
PCT Pub. Date: Feb. 14, 2013

(65) Prior Publication Data
US 2014/0159361 A1    Jun. 12, 2014

Related U.S. Application Data

(60) Provisional application No. 61/521,268, filed on Aug. 8, 2011.

(51) Int. Cl.
*E21B 17/08* (2006.01)
*F16L 15/08* (2006.01)
*F16L 23/036* (2006.01)

(52) U.S. Cl.
CPC ............ *E21B 17/085* (2013.01); *F16L 15/08* (2013.01); *F16L 23/036* (2013.01)

(58) Field of Classification Search
CPC ........ E21B 17/085; F16L 15/08; F16L 23/036
See application file for complete search history.

(56) References Cited

U.S. PATENT DOCUMENTS 3,628,812 A * 12/1971 Larralde ............... F16L 37/133
285/24
3,955,621 A 5/1976 Webb
(Continued)

FOREIGN PATENT DOCUMENTS

CA     2844309 C * 8/2016 .......... E21B 17/085
EP     241990 A1   10/1987
(Continued)

OTHER PUBLICATIONS

International Report on Patentability and Written Opinion for PCT Patent Application No. PCT/US2012/045984 dated Feb. 11, 2014, 10 pages.
(Continued)

*Primary Examiner* — Rodney Mintz
(74) *Attorney, Agent, or Firm* — Conley Rose, P.C.

(57) ABSTRACT

A tubular and tubular connection for joining adjacent tubulars of a tubular string for passage of fluid therethrough is provided. The tubular connection includes a pin end at an end of a first of adjacent tubulars and a box end at an end of a second of the adjacent tubulars. The pin end has an outer locking surface. The box end has a plurality of fingers at an end thereof with slots therebetween. The fingers are selectively extendable for placement about the pin end of the first of the adjacent tubulars. The fingers having an inner locking surface for interlocking engagement with the outer locking surface of the pin end whereby loads are distributed between the adjacent tubulars.

40 Claims, 10 Drawing Sheets

(56) References Cited

U.S. PATENT DOCUMENTS

| | | | |
|---|---|---|---|
| 4,043,575 A | 8/1977 | Roth | |
| 4,124,231 A | 11/1978 | Ahlstone | |
| 4,124,321 A | 11/1978 | Hutchins | |
| 4,153,278 A * | 5/1979 | Ahlstone | F16L 27/06 285/146.3 |
| 4,265,470 A | 5/1981 | Danner | |
| 4,280,719 A | 7/1981 | Daniel et al. | |
| 4,332,509 A | 6/1982 | Reynard et al. | |
| 4,372,584 A * | 2/1983 | Miller | F16L 1/26 285/18 |
| 4,436,157 A | 3/1984 | Brooks | |
| 4,496,172 A | 1/1985 | Walker | |
| 4,496,173 A | 1/1985 | Roche et al. | |
| 4,550,936 A | 11/1985 | Haeber et al. | |
| 4,662,785 A | 5/1987 | Gibb et al. | |
| 4,668,126 A | 5/1987 | Burton | |
| 4,844,511 A | 7/1989 | Galle et al. | |
| 5,048,876 A * | 9/1991 | Wallskog | C10B 25/10 138/89 |
| 5,066,048 A | 11/1991 | Farrell | |
| 5,259,459 A | 11/1993 | Valka | |
| 5,785,357 A * | 7/1998 | Foster | F16L 15/08 285/322 |
| 5,899,507 A * | 5/1999 | Schroeder | E21B 17/085 285/288.1 |
| 5,992,893 A | 11/1999 | Watkins | |
| 6,070,669 A | 6/2000 | Radi et al. | |
| 6,330,918 B1 | 12/2001 | Hosie et al. | |
| 6,401,825 B1 | 6/2002 | Woodrow | |
| 6,419,277 B1 | 7/2002 | Reynolds | |
| 6,557,637 B1 | 5/2003 | Dore et al. | |
| 6,623,044 B1 | 9/2003 | Guesnon et al. | |
| 6,837,311 B1 | 1/2005 | Sele et al. | |
| 7,686,342 B2 | 3/2010 | Jennings et al. | |
| 7,913,767 B2 | 3/2011 | Larson et al. | |
| 8,037,989 B2 | 10/2011 | Neelakantan et al. | |
| 8,192,213 B2 * | 6/2012 | Braden | E21B 17/028 439/194 |
| 9,255,453 B1 * | 2/2016 | Jennings | E21B 17/085 |
| 2004/0036280 A1 * | 2/2004 | Belcher | F16L 21/04 285/222.2 |
| 2005/0146137 A1 | 7/2005 | Davidson et al. | |
| 2005/0207834 A1 * | 9/2005 | Muller | F16L 23/036 403/288 |
| 2007/0267197 A1 * | 11/2007 | Pallini | E21B 17/085 166/367 |
| 2010/0176588 A1 * | 7/2010 | Krausz | F16L 19/061 285/339 |
| 2010/0282474 A1 * | 11/2010 | Mohr | E21B 17/06 166/360 |
| 2010/0326671 A1 | 12/2010 | Buytaert et al. | |
| 2011/0094729 A1 * | 4/2011 | Braden | E21B 17/003 166/65.1 |
| 2012/0096700 A1 * | 4/2012 | Patterson | F16L 25/06 29/428 |
| 2012/0160508 A1 | 6/2012 | Thommesen | |
| 2013/0199801 A1 * | 8/2013 | Johnson | E21B 33/038 166/387 |
| 2013/0199802 A1 * | 8/2013 | Weir | E21B 33/038 166/387 |
| 2013/0249210 A1 * | 9/2013 | Haddox | E21B 33/038 285/305 |
| 2013/0264070 A1 | 10/2013 | Miller et al. | |
| 2015/0114659 A1 * | 4/2015 | Jahnke | E21B 33/038 166/360 |
| 2015/0152693 A1 * | 6/2015 | DeBerry | E21B 17/085 166/344 |
| 2015/0204312 A1 * | 7/2015 | Patterson | F16B 2/14 285/412 |
| 2016/0138742 A1 * | 5/2016 | Ruiz Saura | F16L 23/0286 285/412 |

FOREIGN PATENT DOCUMENTS

| | | |
|---|---|---|
| FR | 1310713 A | 11/1962 |
| GB | 2199102 A | 6/1988 |

OTHER PUBLICATIONS

Invitation to Pay Additional Fees and, Where Applicable, Protest Fee for PCT Patent Application No. PCT/US2012/045984 dated Oct. 2, 2013, 6 pages.

International Search Report for PCT Patent Application No. PCT/US2012/045984 dated Sep. 20, 2013, 6 pages.

Canadian Office Action dated Jan. 20, 2015 for counterpart Canadian Application No. 2,844,309. 3 pages.

Response to Canadian Office Action dated Jan. 20, 2015 filed Jul. 20, 2015 for counterpart Canadian Application No. 2,844,309, 20 pages.

European Patent Application No. 12741157.7, Office Action dated Mar. 2, 2017 (7 pages).

\* cited by examiner

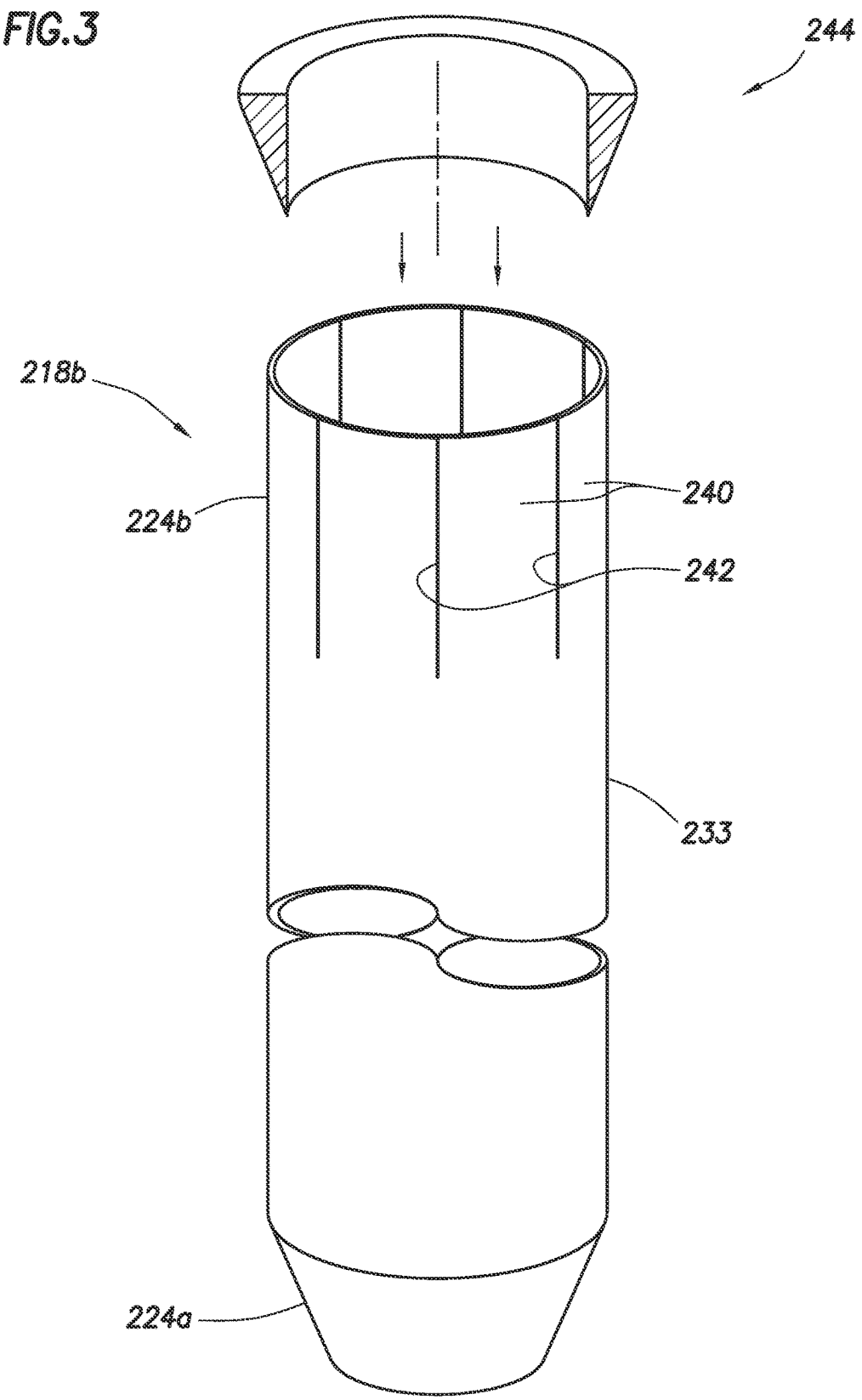

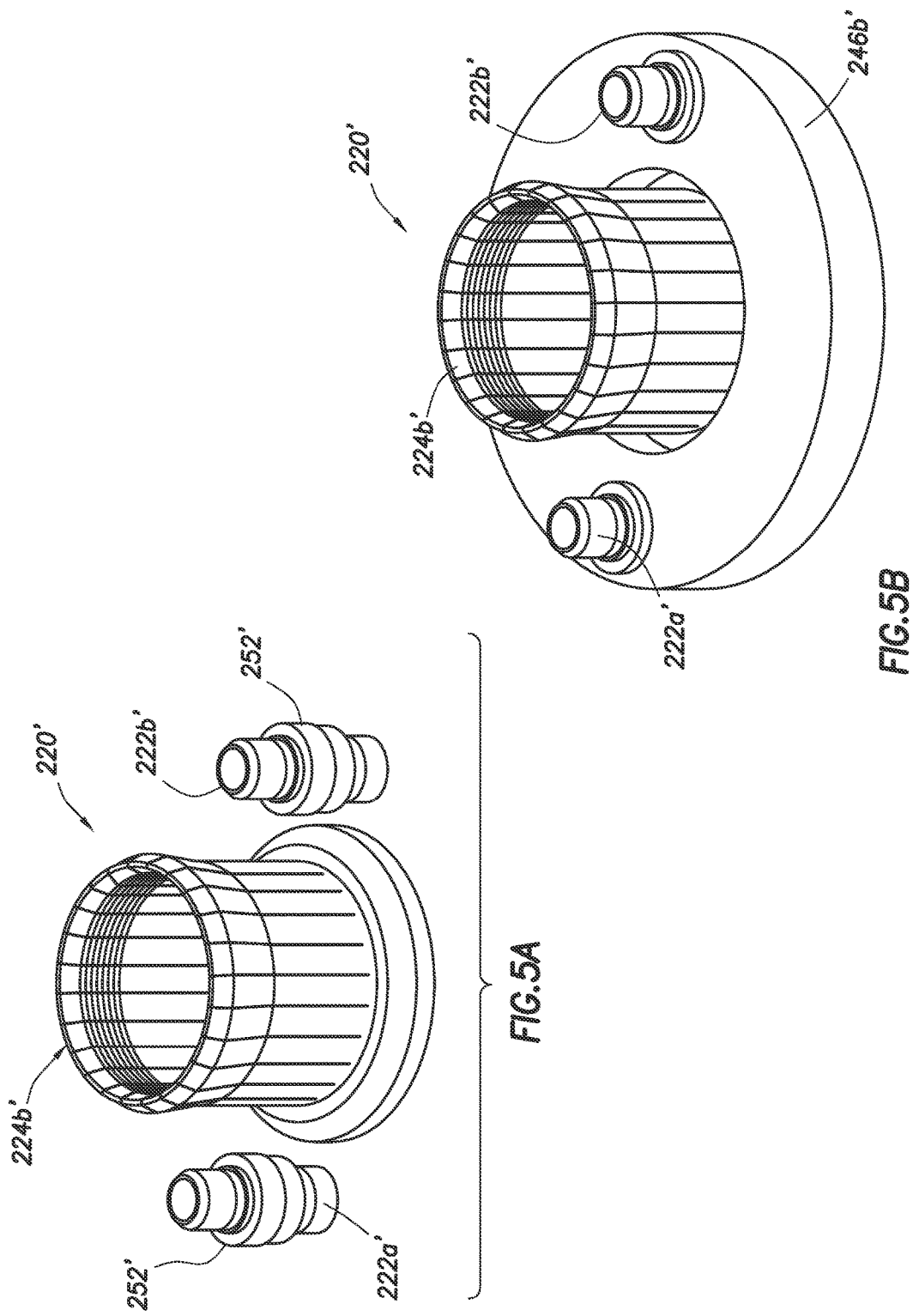

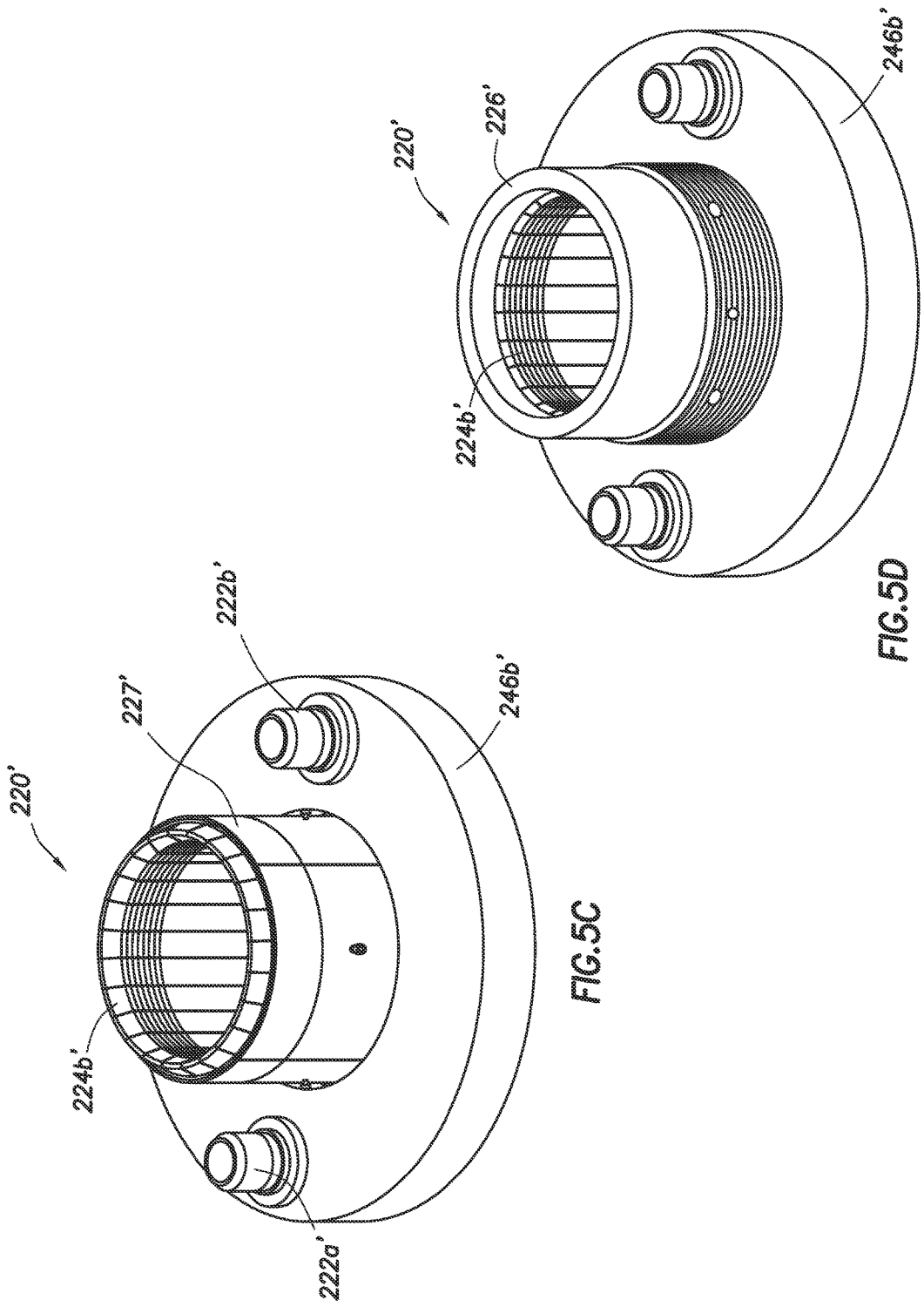

METHOD AND APPARATUS FOR CONNECTING TUBULARS OF A WELLSITE

CROSS-REFERENCE TO RELATED APPLICATIONS

This application claims the benefit of U.S. Provisional Application No. 61/521,268 filed Aug. 8, 2011, the entire contents of which is hereby incorporated by reference.

BACKGROUND

The disclosure relates generally to techniques for performing wellsite operations. More specifically, the disclosure relates to techniques, such as tubulars, tubular connections, and/or tubular brackets, for passage of fluid at a wellsite.

Oilfield operations are typically performed to locate and gather valuable downhole fluids. Some such oilfield operations are performed at offshore locations. Offshore platforms are used to draw fluids from subsea locations to a surface vessel. Subsea equipment may be positioned about the sea floor to access fluid in subsurface formations. A riser may extend from the subsea equipment to a platform to draw the fluid to the surface for capture. The riser may include a series of tubulars connected together to form a fluid path for passage of fluids.

The tubulars of the riser may be exposed to various subsea conditions, such as currents, fluid pressures, sea life, and the like, which may apply forces or otherwise affect performance of the tubulars. Various tubulars have been developed for use in subsea operations as described, for example, in U.S. Pat. Nos. 7,913,767, 7,686,342, 6,557,637, 6,070,669, 5,259,459, 5,066,048, 4,844,511, 4,662,785, 4,496,172, 4,436,157, 4,124,231, 20100326671, 20050146137. Some tubulars are provided with connection devices, such as a bolted flange, a bolt-less connection with locking dogs, a breech lock mechanism with mated dogs, rotatably locking connections, quick bolts, etc.

Despite the development of various tubulars and connections, there remains a need to provide advanced tubular techniques for performing in subsea conditions. The techniques herein are directed to fulfilling this need in the art.

SUMMARY

In at least one aspect, the techniques herein relate to a tubular connection for joining adjacent tubulars of a tubular string for passage of fluid therethrough. The tubular connection includes a pin end and a box end. The pin end is at an end of a first of the adjacent tubulars, and has an outer locking surface. The box end is at an end of a second of the adjacent tubulars, and has a plurality of fingers at an end thereof with slots therebetween. The fingers are selectively extendable for placement about the pin end of the first of the adjacent tubulars, and have an inner locking surface for interlocking engagement with the outer locking surface of the pin end whereby loads are distributed between the adjacent tubulars.

The tubular connection may also include a bracket assembly include a pin flange positionable about the pin end and a box flange positionable about the box end of the adjacent tubulars. The pin end may have a pin shoulder for supporting the pin flange and the box end has a box shoulder for supporting the box flange. The pin flange and the box flange may have holes for supporting a conduit therethrough. The bracket assembly may include at least one connector for securing the conduit in the pin and box flanges.

The tubular connection may also include at least one wedge for securing the fingers about the pin end. The wedge may include an external wedge securable about the plurality of fingers, or an inner wedge and an outer wedge securable about the fingers. The external wedge may have a curved rim for receiving an end of the fingers. The tubular connection may also include a connector for securing the wedge about the box end. The inner and outer locking surfaces may include a plurality of interlocking grooves. The tubular connection may also include a seal ring positionable along an interior of the pin end and an interior of the box end for forming a seal therebetween, and/or at least one gasket positionable about the seal ring. The box end may have a shoulder for receiving the pin end with a gap therebetween. The box end may terminate in a tapered edge.

In another aspect, the techniques herein relate to a tubular of a tubular string for passage of fluid therethrough. The tubular includes a tubing, a pin end and a box end. The tubular may also include a bracket assembly including a pin flange positionable about the pin end and a box flange positionable about the box end. The pin flange and the box flange may have at least one hole therethrough for receivingly supporting at least one conduit. The tubular may also include at least one wedge positionable about the box end for securing the plurality of fingers about the pin end. The wedge may include an external wedge securable about the fingers, or an inner wedge and an outer wedge securable about the fingers. The inner and outer locking surfaces may include a plurality of interlocking grooves. The plurality of fingers are spreadable by advancing a wedge tool into the box end.

In another aspect, the techniques herein relate to a method of connecting a plurality of tubulars to form a tubular string for passage of fluid therethrough. The method involves providing adjacent tubulars of the plurality of tubulars with a tubular connection therebetween. The tubular connection includes a pin end and a box end. The method further involves inserting the pin end of the first of the adjacent tubulars in the box end of the second of the adjacent tubulars, and distributing the loads between the adjacent tubulars by cooperatively engaging the inner locking surface of the plurality of fingers of the box end with the outer locking surface of the pin end.

The method may also involve selectively spreading the plurality of fingers, closing the plurality of fingers about the pin end of the first of the plurality of tubulars, positioning a box flange about the box end of the adjacent tubulars, securing at least one wedge about the plurality of fingers, positioning a pin flange about the pin end of the adjacent tubulars, supporting at least one conduit with the pin flange and the box flange, and/or threadedly connecting the pin flange and the box flange with the at least one wedge. The wedge may include an inner wedge and outer wedge and the method may also involve positioning the inner wedge about the plurality of fingers and positioning the outer wedge about the inner wedge and receiving an end of the plurality of fingers in a rime of the outer wedge.

Finally, in another aspect, the techniques herein relate to a bracket assembly for connecting adjacent tubulars of a tubular string for passage of fluid therethrough. Each of the adjacent tubulars have a pin end and a box end. The bracket assembly includes a pin flange positionable about the pin end of a first of the adjacent tubulars, a box flange positionable about the box end of a second of the adjacent tubulars, and at least one wedge securable about the box end of the second of the adjacent tubulars. The pin flange and the box flange have corresponding holes for supporting the at least one conduit therethrough.

The bracket assembly may also include at least one connector for securing the at least one conduit to the pin and box flanges. The pin and box flanges may be removably connectable to the pin and box ends, or affixed to the pin and box ends. The pin and box flanges may be are removably connectable to the at least one wedge. The wedge may include an external wedge, or an inner wedge and an outer wedge. The outer wedge may have a rim for receiving the box end. The box end has a plurality of fingers at an end thereof with slots therebetween. The fingers may be selectively extendable for placement about the pin end of the second of the plurality of tubulars. The conduit may be a choke, kill, hydraulics, riser fill up, electrical, and/or fluid. The wedge may be threadably connectable to the pin flange and the box flange.

BRIEF DESCRIPTION DRAWINGS

So that the above recited features and advantages can be understood in detail, a more particular description, briefly summarized above, may be had by reference to the embodiments thereof that are illustrated in the appended drawings. It is to be noted, however, that the appended drawings illustrate only typical embodiments and are, therefore, not to be considered limiting of its scope. The figures are not necessarily to scale and certain features and certain views of the figures may be shown exaggerated in scale or in schematic in the interest of clarity and conciseness.

FIG. 3 is a schematic view of a tubular and a wedge tool usable therewith.

FIGS. 5A-5D are schematic perspective views of various portions of the alternate tubular connection of FIG. 4B.

DETAILED DESCRIPTION

The description that follows includes exemplary systems, apparatuses, methods, and instruction sequences that embody techniques of the inventive subject matter. However, it is understood that the described embodiments may be practiced without these specific details.

The techniques herein relate to risers formed from a series of tubulars with tubular connections therebetween. Tubulars may refer to conduit, pipes, tubing or other tubular members for passing fluids, wiring, signals or other items therethrough. One or more tubulars may be connected in series to form a tubular string, such as a riser. The tubular connections may be devices for coupling tubulars together, for example, in series to create a tubular string.

The depths of wellbore operations may require the use of numerous tubulars (for example, about 100 connections) to reach certain locations. It may be desirable to minimize the time required to assemble the tubulars (for example reducing from about two to ten minutes per tubular connection to about thirty seconds per tubular connection). Moreover, the tubulars and tubular connections may be configured for assembly with little to no human interaction. Tubulars and/or tubular connections may also be configured with tubular devices, such as fingers, brackets and/or wedges, for distributing loads between the tubulars. Such tubular devices may also be configured for quick disconnect and/or modular capabilities to allow for adaptability to specific applications.

Figure 1:
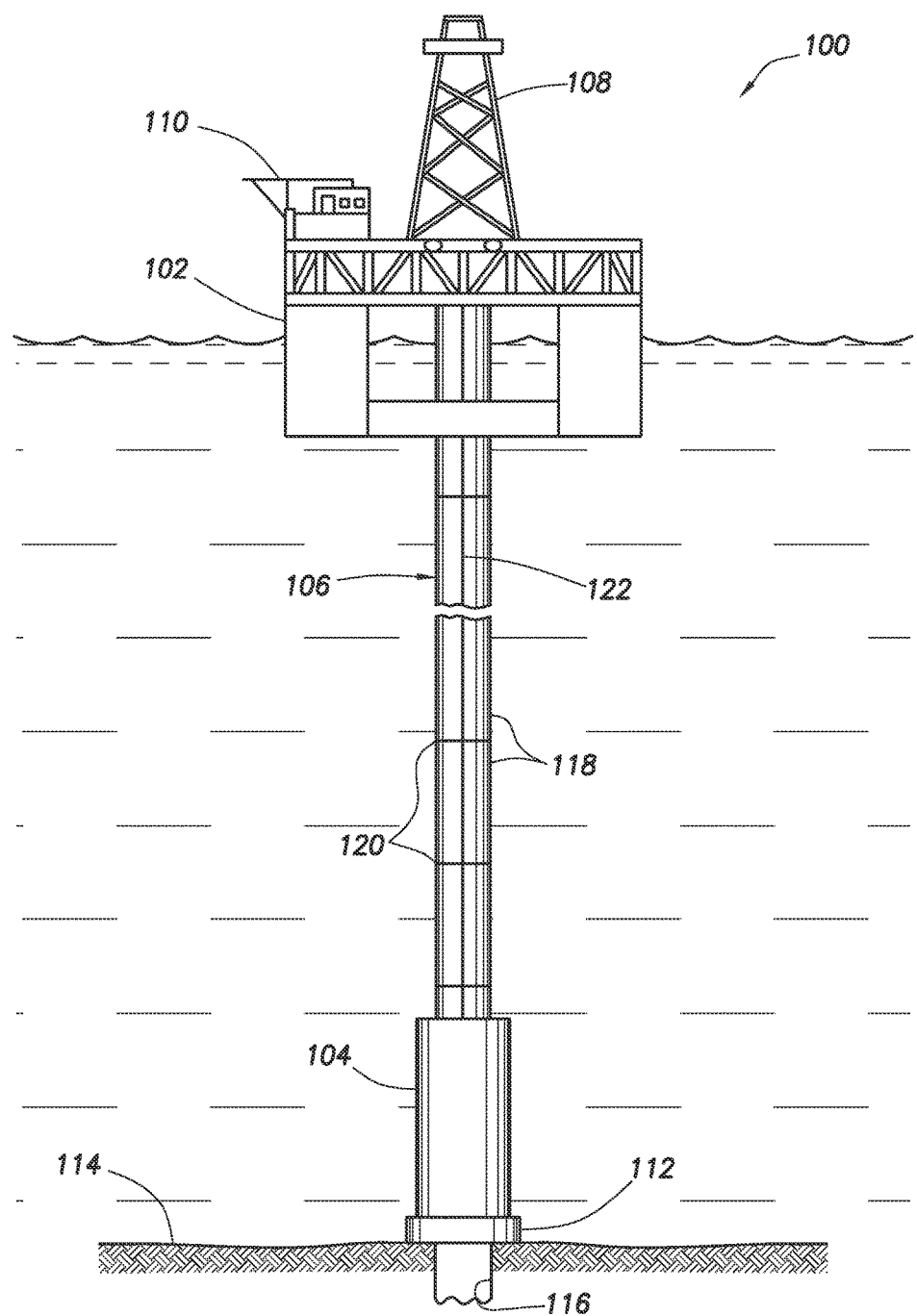
FIG. 1 is a schematic view of an offshore wellsite having a riser extending from a surface platform to subsea equipment, the riser including a series of tubulars with tubular connections therebetween.

FIG. 1 depicts a wellsite 100 having a surface platform 102 and subsea equipment 104, with a riser 106 therebetween. The surface platform 102 has a rig 108 and other surface equipment 110 for operating the wellsite 100. The subsea equipment 104 is positioned about a wellhead 112 located on sea floor 114 adjacent a wellbore 116. The subsea equipment 104 is schematically depicted as a box adjacent the wellhead 112, but may be positioned about the sea floor 114 and may include various subsea components, such as strippers, blowout preventers, manifolds and/or other subsea devices for performing subsea operations.

The riser 106 is a system of tubulars 118 that forms a long tube for joining the drilling rig 108 on the platform 102 to the wellhead 112 on the sea floor 114. The riser 106 may be used to extend the drilled hole through the water and/or for allowing drilling mud to be captured as it returns to surface. The riser 106 may also be provided with one or more external conduits 122 for performing various functions, such as electrical or fluid conduit (e.g., choke and kill, glycol, hydraulics, and/or riser-fill-up, etc.) The conduit(s) 122 may run along the riser 106 from the surface platform 102 to the subsea equipment 104. The conduits 122 may include various tubing, cables or other passage mechanisms for the passage of fluids.

The tubulars 118 may be tubular members (about 75 feet (22.86 m) in length) with a tubular connection 120 therebetween. The tubular connections 120 may join the tubulars 118 together by bolts, welding, and/or other connecting means. The tubular connections 120 may also support one or more conduits 122 in a desired configuration about the riser 106. The tubulars 118 and the tubular connections 120 may be modular for use with selected combinations of conduits 122. Each tubular connection 120 may be configured and selected for use with a selected tubular 118. The tubulars 118 and the tubular connections 120 may be configured to support the riser 106 and the conduits 122 in position in subsea conditions.

While FIG. 1 shows a series of tubulars 118 forming a riser 106 in a subsea application, it will be appreciated that the tubulars 118 and tubular connections 120 may be used in a variety of land or water based applications.

Figure 2A:
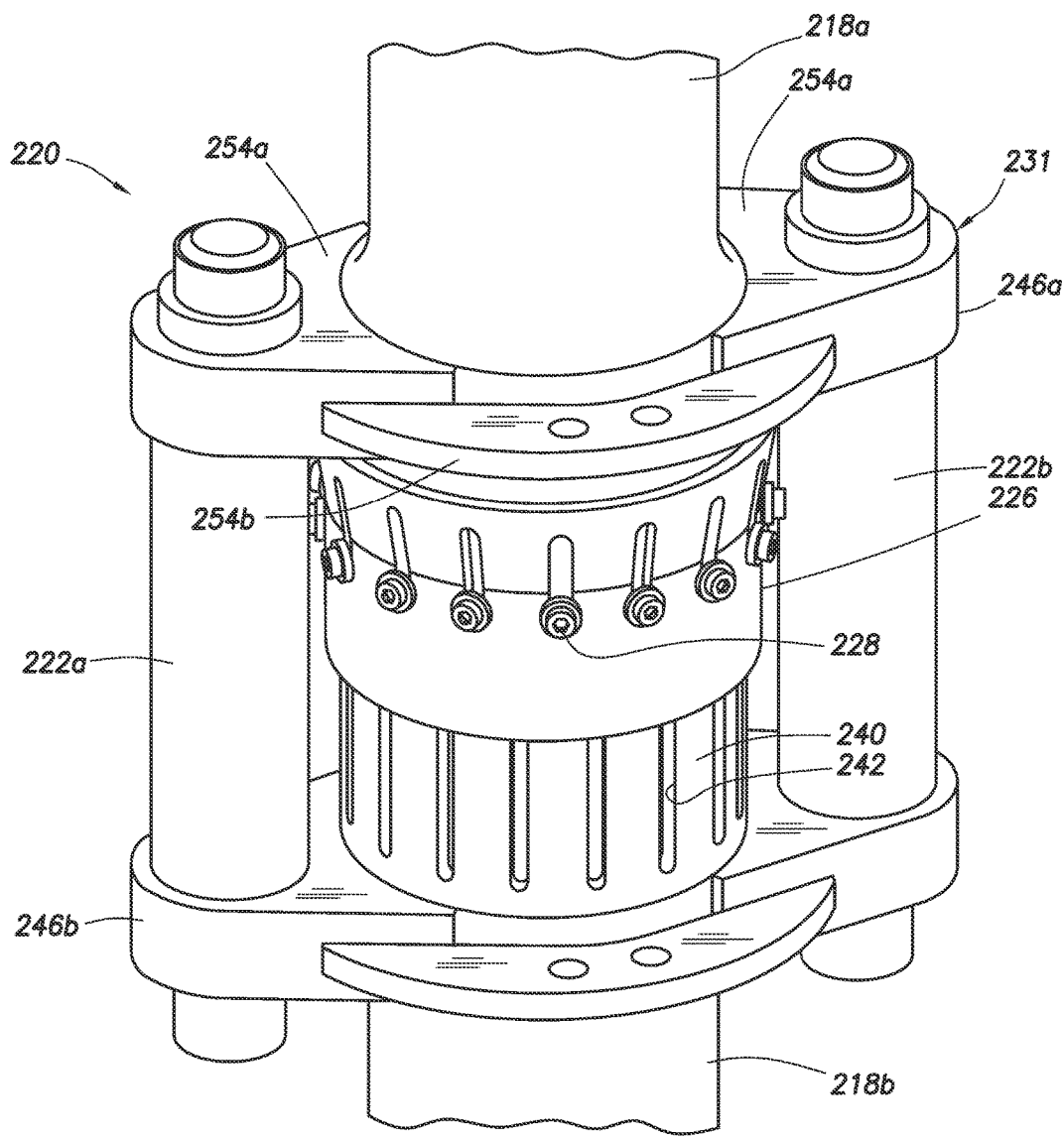
FIGS. 2A-2C are various schematic views depicting a tubular connection between adjacent tubulars in greater detail.
Figure 2B:
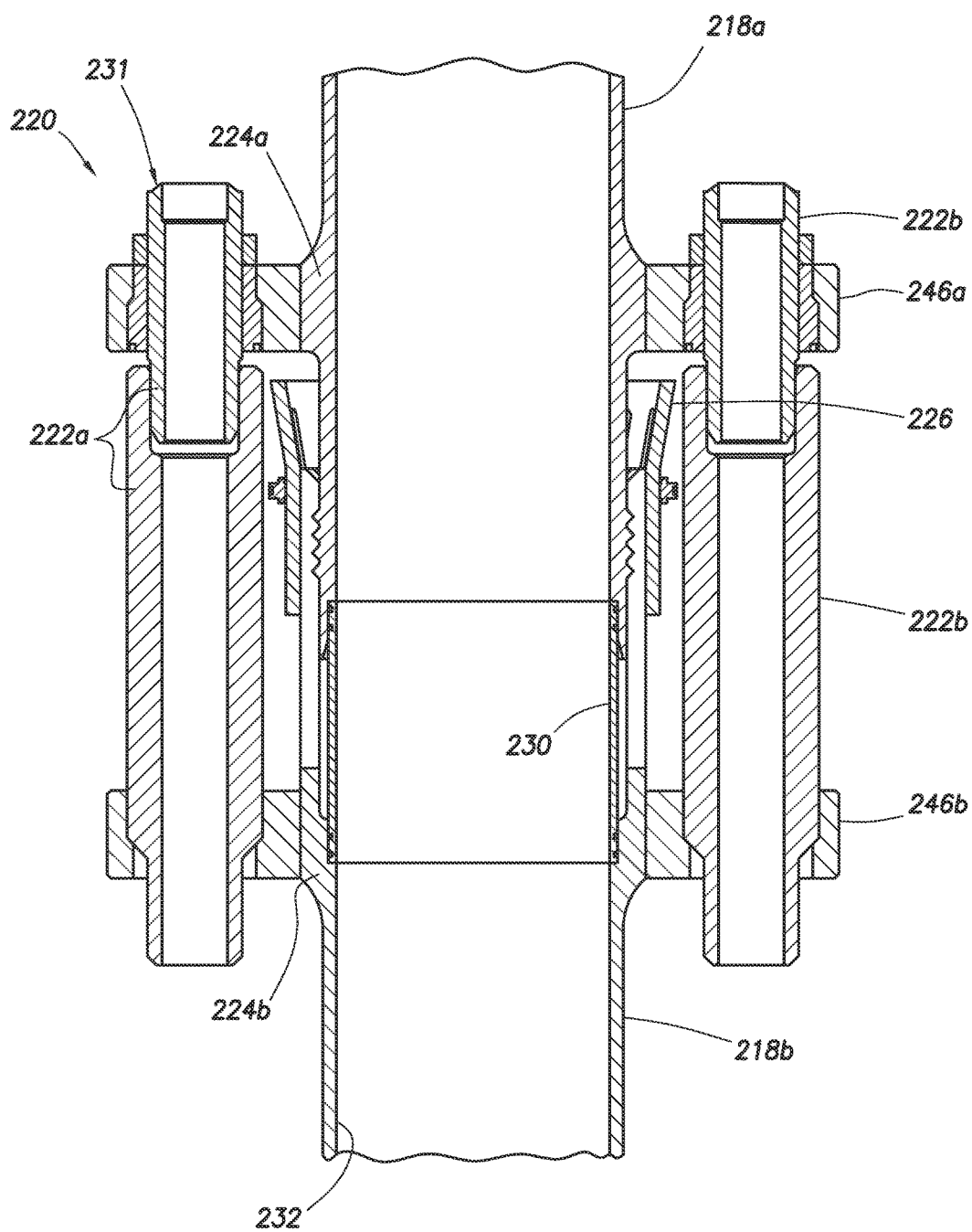
Figure 2C:
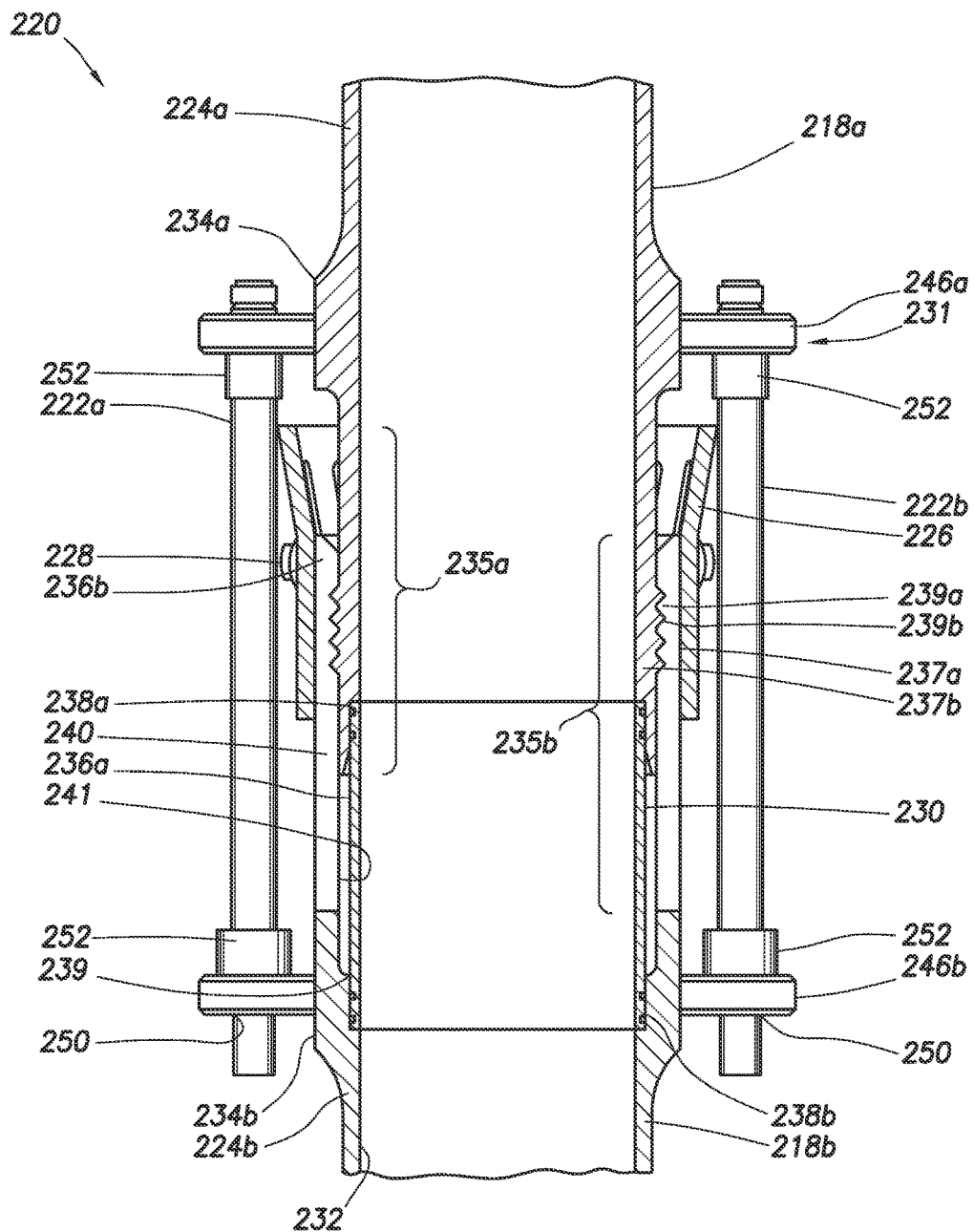

FIGS. 2A-2C depict adjacent tubulars 218a,b with a tubular connection 220 therebetween, usable as the tubulars 118 and tubular connections 120 of FIG. 1. FIG. 2A shows a schematic perspective view of the adjacent tubulars 218a,b and tubular connection 220. FIGS. 2B and 2C show schematic longitudinal cross-sectional views of the adjacent tubulars 218a,b and tubular connection 220.

In FIGS. 2A-2C, an upper tubular 218a with a pin end 224a is inserted into a box end 224b of a lower tubular 218b. A slotted external wedge 226 is positioned on an outer surface of the box end 224b and secured to the box end 224b by a connector (or connecting means) 228, such as bolts. A seal ring 230 is positioned between the upper tubular 218a and the lower tubular 218b. A passage 232 extends through the adjacent tubulars 218a,b for passing fluid therethrough.

The upper tubular 218a has an external shoulder 234a on an exterior surface thereof. The pin end 224a of the upper tubular 218a has a pin portion 235a extending from the external shoulder 234a and terminating in an edge 236a. An internal shoulder 238a is positioned on an inner surface of the upper tubular 218a a distance from the edge 236a. The internal shoulder 238a is configured for receiving the seal ring 230.

The lower tubular 218b has an external shoulder 234b on an exterior surface thereof. The box end 224b of the lower tubular 218a has a box portion 235b extending from the external shoulder 234b and terminating in a plurality of fingers 240 with slots 242 therebetween. The external shoulder 234b of the box end 224b has an internal shoulder 238b on an inner surface thereof for receiving the seal ring 230. The seal ring 230 is positioned between the internal shoulder 238a of the pin end 224a and the internal shoulder 238b of the box end 224b, and supported therein. Gaskets may optionally be provided for further sealing the pin and box ends 224a,b. The external shoulder 234b also has a step 239 on the inner surface thereof. The step 239 defines a gap 241 between the seal ring and a portion of the inner surface of the external shoulder 234b and a portion of an inner surface of the fingers 240.

The fingers 240 are radially positioned about the box end 224b of the lower tubular 218b. The fingers 240 have a tapered edge 236b on an end thereof to facilitate receipt of the pin end 224a. The fingers 240 may be spread for insertion of the pin end 224a into the box end 224b during make up. The box end 224b has slots 242 between the fingers 240 to allow the box end 224b to extend as the pin end 224a is positioned inside the box end 224b during the makeup process.

FIG. 3 schematically depicts the tubular 218b and a wedge tool 244 usable therewith for spreading the fingers 240. The tubular 218b has a pin end 224a and a box end 224b with a tubing (or tubular body) 233 therebetween. The fingers 240 at the box end 224b may be spread to facilitate insertion of the pin end 224a of an adjacent tubular (e.g., upper tubular 218a) into the box end 224b of the lower tubular 218b. The wedge tool 244 may be advanced into the box end 224b to spread the fingers 240 to a desired diameter.

Referring back to FIGS. 2A-2C, once the pin end 224a is in place in the box end 224b, the fingers 240 may be relaxed and the external wedge 226 positioned thereabout to keep the fingers 240 from opening during operation. The external wedge 226 is insertable over the box end 224b to secure the box end 224b to the pin end 224a. The external wedge 226 (and the seal ring 230) may be positioned about the box end 224b before the pin end 224a is inserted into the box end 224b. The external wedge 226 is tapered to facilitate advancement of the external wedge 226 over the fingers 240 into a desired position. The external wedge 226 may be advanced over the box end 224b to close the fingers 240 about the pin end 224a and secure the fingers 240 thereabout with the bolts 228. The fingers 240 act as leaf-springs about the pin end 224a.

The pin and box ends 224a,b are mated such that loads are distributed therebetween. The pin end 224a of the upper tubular 218a has an outer locking surface 237a on an outer surface thereof, and the fingers 240 have an inner locking surface 237b on an inner surface thereof. The inner locking surface 237b of the lower tubular 218b cooperatively engages the outer locking surface 237a of the upper tubular 218a for defining a load interface therebetween. The inner and outer locking surfaces 237a,b are used to distribute loads between the adjacent tubulars 218a,b.

As shown, the inner and outer locking surfaces 237a,b have flat portions flush with each other for an interference fit therebetween. The inner and outer locking surfaces 237a,b may also have rings thereon that form interlocking ridges (or grooves) 239a,b between the upper and lower tubulars 218a,b, respectively. During assembly, the fingers 240 are advanced such that the interlocking surfaces 237a,b (and ridges 239a,b) are placed in position for interlocking engagement. The external wedge 236 provides additional support about the fingers 240 to facilitate engagement between the interlocking surfaces 237a,b and the grooves 239a,b.

The tubular connection 220 may also include a bracket assembly 231 positionable about the upper tubular 218a and the lower tubular 218b for supporting one or more conduits 222a,b. The bracket assembly 231 includes an pin flange 246a and a box flange 246b with conduits 222a,b therebetween. The pin flange 246a is positionable circumferentially about the tubular 218a on external shoulder 234a, and the box flange 246b is positionable circumferentially about the tubular 218b on external shoulder 234b. The external shoulders 234a,b may provide the tubing 233 with additional thickness for supporting the flanges 246a,b about the tubulars 218a,b.

The pin and box flanges 246a,b may have one or more holes 250 therethrough for receiving one or more conduits 222a,b. The conduits 222a,b may each include one or more conduits 222a,b having pin/box ends for connection in series as shown in FIGS. 2B and 2C. Additional conduit portions may be connected to both ends of the conduits 222a,b to form a chain of conduit extending along the tubulars 218a,b, similar to the conduits 122 of FIG. 1. Connectors 252, such as a nut, are positionable about the pin and box flanges 246a,b for securing conduits 222a,b therein.

The pin and box flanges 246a,b are each shown as ring shaped members surrounding the upper and lower tubulars 218a,b. Each flange 246a,b has first portions 254a extending radially for supporting a choke conduit 222a and a kill conduit 222b, and a second portion 254b for supporting cable conduits (not shown).

The tubulars 218a,b and/or bracket assembly 231 may be modularly configurable as desired. The tubulars 218a,b and/or bracket assembly 231 may be permanently assembled (e.g., by welding), or removably assembled (e.g., by threading) to form the tubular connection(s) 220. The pin and box flanges 246a,b may be connected to the external shoulders 234a,b, for example, by welding. While specific holes 250 and conduits 222a,b are depicted, a variety of configurations may be provided. The bracket assembly 231 is configurable to the specific needs of the application. The bracket assembly 231 may be modular for connection to a desired configuration of tubulars 218a,b. The configuration (e.g., diameter) of the tubulars 218a,b may also be selected for the desired application.

Figure 4A:
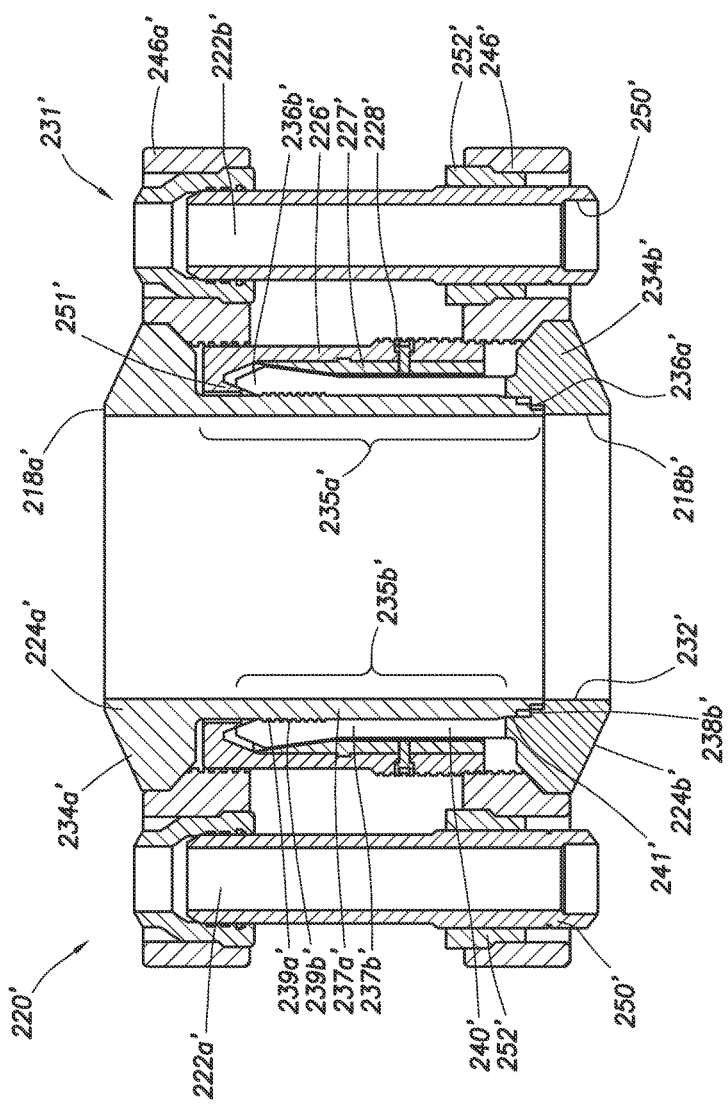
FIGS. 4A-4B are schematic cross-sectional and assembly views, respectively, of an alternate tubular connection.

FIGS. 4A-5D depict alternate tubulars 218a',b' with an alternate tubular connection 220' therebetween, usable as the tubulars 118 and tubular connections 120 of FIG. 1. FIGS. 4A and 4B are longitudinal cross-sectional and exploded views, respectively, of portions of adjacent tubulars 218a',b' forming the tubular connection 220'. FIGS. 5A-5D are schematic perspective views of various portions of the tubular connection 220'.

Figure 4B:
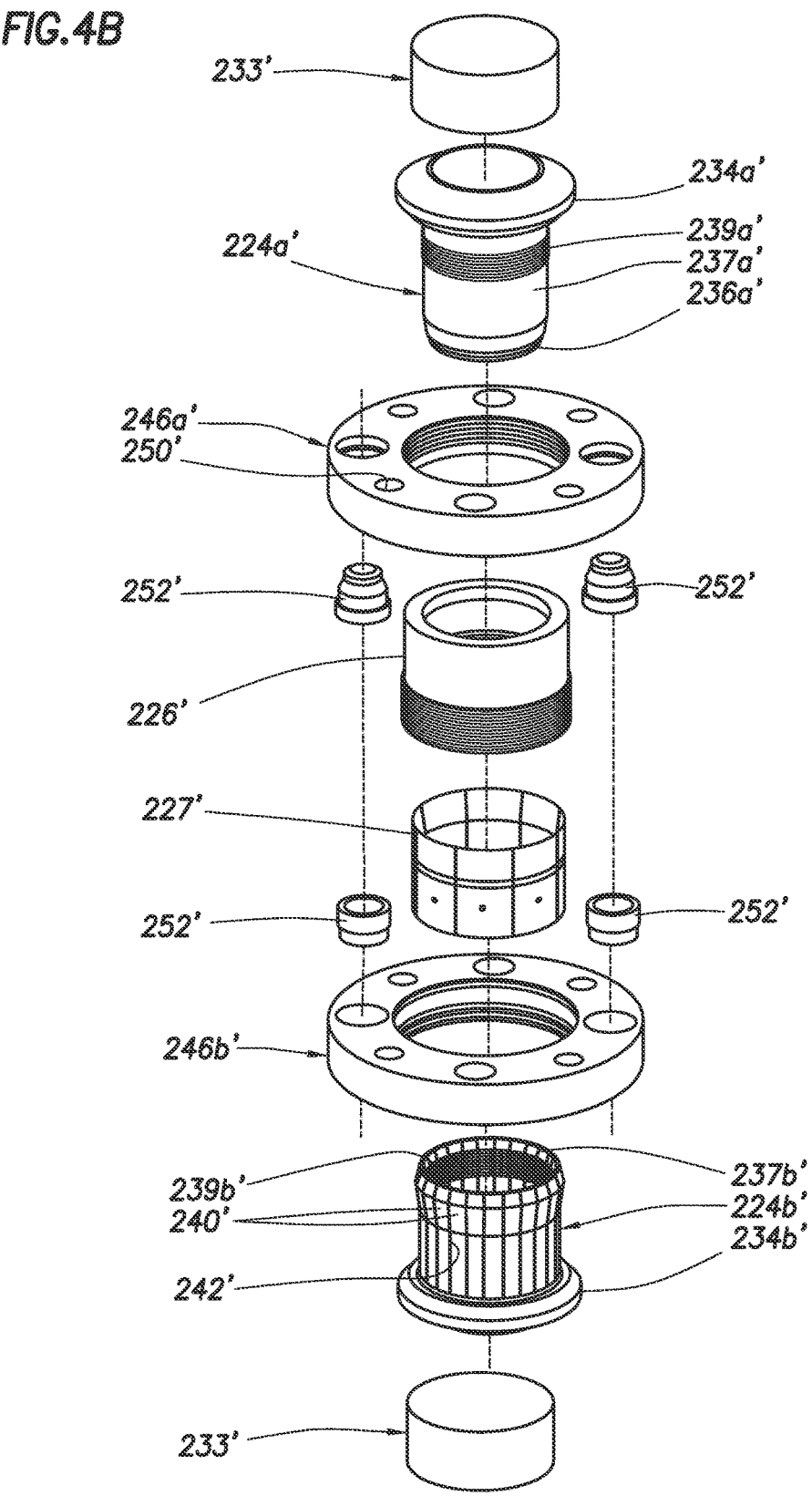

As shown in FIGS. 4A and 4B, the upper tubular 218a' has a pin end 224a' inserted into a box end 224b' of the adjacent lower tubular 218b'. An outer wedge 226' and an inner wedge 227' are positioned on an outer surface of the box end 224b' and secured to the box end 224b'. A passage 232' extends through the adjacent tubulars 218a',b' for passing fluid therethrough.

The upper tubular 218a' has an external shoulder 234a' on an exterior surface thereof. The pin end 224a' of the upper tubular 218a' has a pin portion 235a' extending from the external shoulder 234a' and terminating in a stepped edge 236a'. The stepped edge 236a' may be formed from multiple rings along the exterior surface of the pin end 224a'.

The lower tubular 218b' has an external shoulder 234b' on an exterior surface thereof. The box end 224b' of the lower tubular 218a' has a box portion 235b' extending from the external shoulder 234b' and terminating in a plurality of fingers 240' with slots 242' therebetween. The external shoulder 234b' has a stepped inner shoulder 238b' on an inner surface thereof for receiving the stepped edge 236a' of the pin end 224a'. The stepped inner shoulder 238b' may be formed from multiple rings along an interior surface of the box end 224b' that cooperatively engage the rings of the stepped edge 236a'. A gap 241' may be present between the stepped edge 234a' and the stepped shoulder 234b'. A seal may optionally be provided, but is not required, between the upper and lower tubulars 218a',b'.

The fingers 240' are radially positioned about the box end 224b' of the lower tubular 218b'. The fingers 240' have a tapered edge 236b' on an end thereof to facilitate receipt of the pin end 224a'. The fingers 240' may be similar to the fingers 240 previously described and spread for makeup between the pin and box ends 224a',b' as previously described with respect to the pin and box ends 224a,b of FIGS. 2A-3.

Referring still to FIGS. 4A and 4B, once the pin end 224a' is in place in the box end 224b', the fingers 240' may be relaxed and the outer and inner wedges 226',227' positioned thereabout to keep the fingers 240' from opening during operation. The inner wedge 227' is insertable over the box end 224b' to position the fingers 240' over the pin end 224a'. The inner wedge 227' has a ring shaped body tapered to facilitate advancement of the inner wedge 227' over the fingers 240' into a desired position. The inner wedge 227' may be advanced over the box end 224b' to close the fingers 240' about the pin end 224a'.

The outer wedge 226' is positionable around the inner wedge 227' and the fingers 240' to secure the box end 224b' to the pin end 224'. The outer wedge 226' has a ring shaped body with a curved rim 251' on an end thereof extending inwardly and shaped to receive an end of the fingers 240'. An inner surface of the outer wedge 226' is shaped to receive the inner wedge 227'.

The outer and inner wedges 226',227' are insertable over the box end 224b' to close the fingers 240' about the pin end 224a'. The outer and inner wedges 226',227' may be positioned about the box end 224b' before the pin end 224a' is inserted into the box end 224b'. The outer and inner wedges 226', 227' may be secured in position about the fingers 240' with connectors 228', such as bolts.

The pin and box ends 224a',b are mated such that loads are distributed using locking surfaces 237a',b' and grooves 239a',b' similar to the locking surfaces 237a,b and grooves 239a,b previously described with respect to FIGS. 2A-2C. The outer and inner wedges 226', 227' provide additional support about the fingers 240' to facilitate engagement between the locking surfaces 237a',b' and the grooves 239a',b'.

The tubular connection 220' includes a bracket assembly 231' positioned about the upper tubular 218a' and the lower tubular 218b'. The bracket assembly 231' is similar to the bracket assembly 231 for supporting conduits 222a'b', such as the conduits 122 of FIG. 1. In the configuration of FIGS. 4A-5D, the bracket assembly 231' includes an pin flange 246a' and a box flange 246b' with conduits 222a',b' therebetween. The pin flange 246a' is positionable circumferentially about the tubular 218a' on external shoulder 234a', and the box flange 246b' is positionable circumferentially about the tubular 218b' on external shoulder 234b'. The external shoulders 234a',b' may provide the tubing 233' with additional thickness for supporting the flanges 246a',b' about the tubulars 218a',b'.

The pin and box flanges 246a',b' may have one or more holes 250' therethrough for receiving one or more conduits 222a'b'. The conduits 222a',b' may be in one or more portions connected to the pin and box flanges 246a',b' as shown in FIG. 4A. Additional conduit portions may be connected to both ends of the conduits 222a',b' to form a chain of conduit extending along the tubulars 218a',b', similar to the conduit 122 of FIG. 1. Connectors 252', such as a nut, are positionable about the box flange 246b' for securing conduits 222a',b' in the flanges 246a',b'. As shown in FIG. 4B, the nuts 252' are threadably connectable to the box flange 246,b' and to the conduits 222a',b'.

The pin and box flanges 246a',b' are each shown as flanged shaped portions encircling the upper and lower tubulars 218a',b'. Each flange 246a',b' has an elliptical ring 246a',b' for supporting a choke conduit 222a' and a kill conduit 222b' and other cable conduits (not shown). The pin and box flanges 246a',b' may also be configured for connection about the upper and lower external shoulders 224a', b'. The pin and box flanges 246a',b' may also be configured to support and or receive the outer wedge 216' when positioned about the pin and box ends 224a',b'.

As further shown in FIG. 4B, various components, such as the outer wedge 226' and the nuts 252' may be provided with threaded connections for engaging the pin and/or box flanges 246a',b'. Tubing 233' may also be integrally formed with, permanently affixed to and/or removably attached to the pin and box ends 224a',b'. Various conduits and tubings, such as conduits 222a',b' and tubing 233', may be connected to the threaded connection 220' to form the riser as shown in FIG. 1.

FIGS. 5A-5D show schematic views of portions of the alternate tubular connection 220' in various stages of assembly. FIG. 5A shows the box end 224b' with the conduits 222a',b' on either side thereof. Connectors (e.g., nuts) 252' are positioned on the conduits 222a',b'. In FIG. 5B, the box end 224b' with the box flange 246b' positioned thereon and with the conduits 222a',b' and nuts 252' secured to the box flange 246b'. FIG. 5C shows the inner wedge 227' positioned about the box end 246b' with conduits 222a',b' therein. FIG. 5D shows the outer wedges 226' positioned about the inner wedge 227'.

While the tubulars and threaded connections provided herein are depicted in specific configurations, it will be appreciated by one of skill in the art that the configurations may be varied, for example, to adapt to various riser configurations. In another example, the bracket assembly 231, 231' and/or holes 250,250' may be configured to receive the desired number and size of conduits 122,222a,b,a',b'. The tubulars and/or threaded connections may be modularly configurable as desired. The size and configuration of the tubulars 218a,a',b,b' may be selected for the desired application, and the tubular connection 220,220' may be selected for connection therewith. The tubulars and/or tubular connections may be permanently assembled (e.g., by welding), or removably assembled (e.g., by threading).

The tubulars used herein may be tubulars with the pin end 224a at one end and the box end 224b at the other end, such as depicted in FIG. 3. The tubulars may be made of the same material as conventional tubulars. The tubular are described as upper and lower according to the orientation depicted in FIGS. 2A-2C, 4A-5B with the pin end 224*a,a'* at a lower end and a box end 224*b,b'* at an upper end, but could be in any orientation as selected. The pin portions 235*a,a'* and/or the box portions 235*b,b'* may be formed integrally with or separate from the external shoulders 234*a,a',b,b'* and/or tubing 233,233'. The pin portion 235*a,a'* and the box portion 235*b,b'* may be welded or otherwise joined with the external shoulders 234*a,a',b,b'* and/or the tubular body 233,233'.

Figure 6:
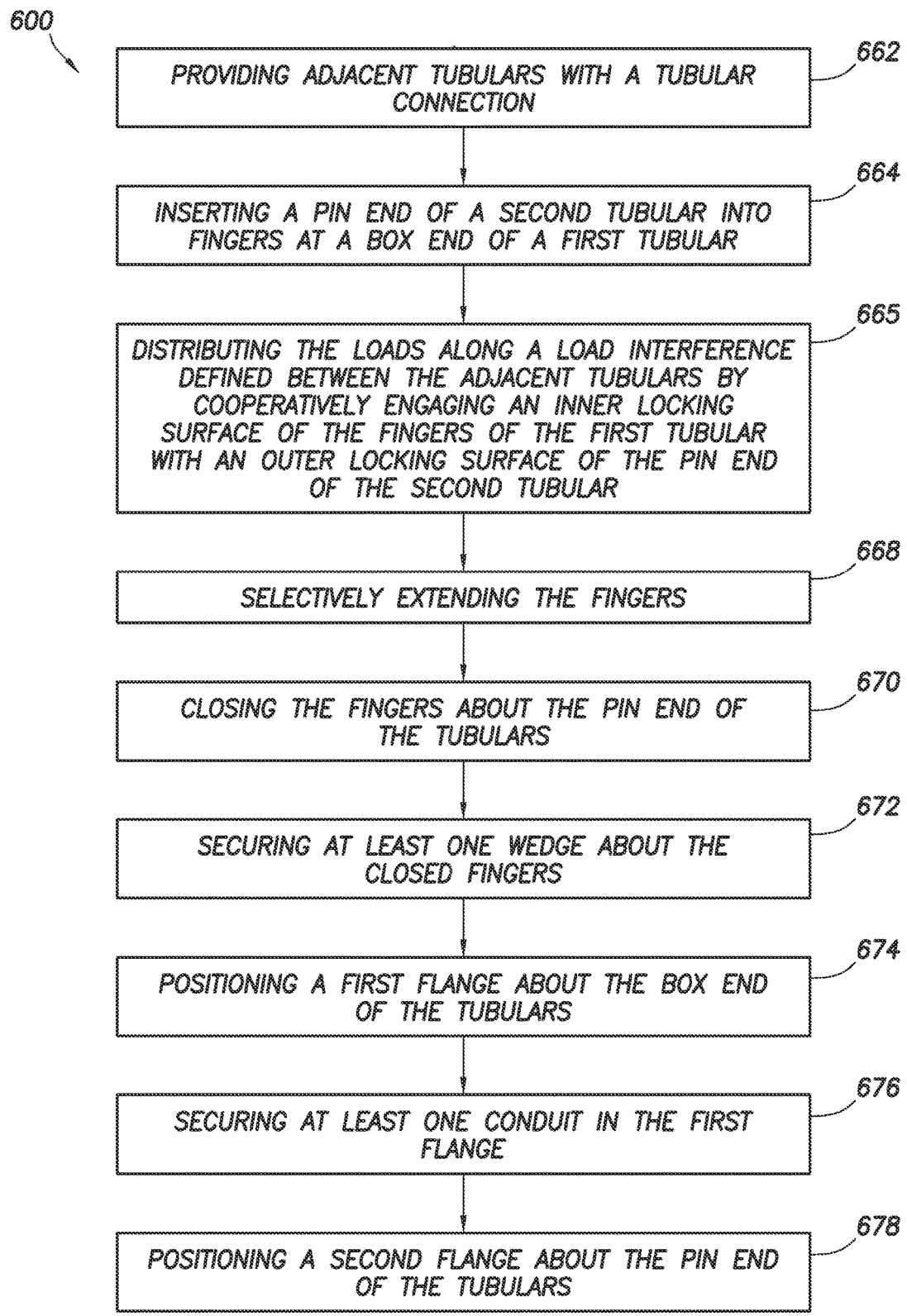
FIG. 6 is a flow chart depicting a method of connecting tubulars.

FIG. 6 depicts a method 600 of connecting tubulars. The method 600 involves providing (662) adjacent tubulars with a tubular connection, such as those described herein. The method also involves inserting (664) the pin end of a second of the plurality of tubulars in the box end of the first of the plurality of tubulars, and distributing (665) the loads along a load interference defined between the adjacent tubulars by cooperatively engaging an inner locking surface of the plurality of fingers of the first tubular with an outer locking surface of the pin end of the second tubular.

The method may also involve selectively extending (668) the plurality of fingers, closing (670) the plurality of fingers about the pin end of the first of the plurality of tubulars, securing (672) at least one wedge about the closed plurality of fingers, positioning (674) a first flange about the box end of the adjacent tubulars, securing (676) at least one conduit in the first flange, positioning (678) a second flange about the pin end of the adjacent tubulars.

The steps may be performed in any order, and repeated as desired.

It will be appreciated by those skilled in the art that the techniques disclosed herein can be implemented for automated/autonomous applications via software configured with algorithms to perform the desired functions. These aspects can be implemented by programming one or more suitable general-purpose computers having appropriate hardware. The programming may be accomplished through the use of one or more program storage devices readable by the processor(s) and encoding one or more programs of instructions executable by the computer for performing the operations described herein. The program storage device may take the form of, e.g., one or more floppy disks; a CD ROM or other optical disk; a read-only memory chip (ROM); and other forms of the kind well known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here. Aspects of the subject matter may also be configured to perform the described functions (via appropriate hardware/software) solely on site and/or remotely controlled via an extended communication (e.g., wireless, internet, satellite, etc.) network.

While the embodiments are described with reference to various implementations and exploitations, it will be understood that these embodiments are illustrative and that the scope of the inventive subject matter is not limited to them. Many variations, modifications, additions and improvements are possible. For example, one or more brackets, wedges and or fingers may be positioned about the tubulars and/or risers as desired. Also, features of the tubular connection 220 may be used with the alternate tubular connection 220' and vice versa.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A tubular connection for joining adjacent tubulars of a tubular string for passage of fluid therethrough, the tubular connection comprising:
a pin end located at an end of a first of the adjacent tubulars, the pin end having an outer locking surface;
a box end located at an end of a second of the adjacent tubulars, the box end having a plurality of fingers located at an end region thereof with slots positioned therebetween, the plurality of fingers selectively extendable for placement about the pin end of the first of the adjacent tubulars, the plurality of fingers having an inner locking surface for interlocking engagement with the outer locking surface of the pin end whereby loads are distributed between the adjacent tubulars; and
at least one wedge configured to secure the plurality of fingers about the pin end.

2. The tubular connection of claim 1, wherein the at least one wedge comprises an external wedge securable about the plurality of fingers.

3. The tubular connection of claim 1, wherein the at least one wedge comprises an inner wedge and an outer wedge securable about the plurality of fingers.

4. The tubular connection of claim 1, wherein the external wedge has a curved rim for receiving an end of the plurality of fingers.

5. The tubular connection of claim 1, further comprising a connector for securing the at least one wedge about the box end.

6. The tubular connection of claim 1, wherein the inner and outer locking surfaces comprise a plurality of interlocking grooves.

7. The tubular connection of claim 1, wherein the box end has a shoulder for receiving the pin end with a gap therebetween.

8. The tubular connection of claim 1, wherein the box end terminates in a tapered edge.

9. The tubular connection of claim 1, further comprising a seal ring positionable along an interior of the pin end and an interior of the box end for forming a seal therebetween.

10. The tubular connection of claim 9, further comprising at least one gasket positionable about the seal ring.

11. The tubular connection of claim 1, further comprising a bracket assembly comprising a pin flange positionable about the pin end and a box flange positionable about the box end of the adjacent tubulars.

12. The tubular connection of claim 11, wherein the pin end has a pin shoulder for supporting the pin flange and the box end has a box shoulder for supporting the box flange.

13. The tubular connection of claim 11, wherein the pin flange and the box flange have holes for supporting a conduit therethrough.

14. The tubular connection of claim 11, wherein the bracket assembly further comprises at least one connector for securing the at least one conduit in the pin and box flanges.

15. A tubular for connecting to a tubular string for passage of fluid therethrough, the tubular comprising:
   a tubing;
   a pin end located at a first end of the tubing, the pin end having an outer locking surface;
   a box end located at a second end of the tubing, the box end having a plurality of discrete fingers located at an end region thereof, the plurality of fingers selectively extendable for placement about the pin end of an adjacent tubular, the plurality of fingers having an inner locking surface for interlocking engagement with the outer locking surface of the pin end of the adjacent tubular whereby loads are distributed between the adjacent tubulars; and
   at least one wedge positionable about the box end for securing the plurality of fingers about the pin end.

16. The tubular of claim 15, wherein the at least one wedge comprises an external wedge securable about the plurality of fingers.

17. The tubular of claim 15, wherein the at least one wedge comprises an inner wedge and an outer wedge securable about the plurality of fingers.

18. The tubular of claim 15, wherein the inner and outer locking surfaces comprise a plurality of interlocking grooves.

19. The tubular of claim 15, wherein the plurality of fingers are spreadable by advancing a wedge tool into the box end.

20. The tubular of claim 15, further comprising a bracket assembly comprising a pin flange positionable about the pin end and a box flange positionable about the box end.

21. The tubular of claim 20, wherein the pin flange and the box flange have at least one hole therethrough for receivingly supporting at least one conduit.

22. A bracket assembly for connecting adjacent tubulars of a tubular string for passage of fluid therethrough, each of the adjacent tubulars having a pin end and a box end, the bracket assembly comprising:
   a pin flange positionable about the pin end of a first of the adjacent tubulars;
   a box flange positionable about the box end of a second of the adjacent tubulars; and
   at least one wedge securable about the box end of the second of the adjacent tubulars;
   wherein the pin flange and the box flange have corresponding holes for supporting at least one conduit therethrough.

23. The bracket assembly of claim 22, further comprising at least one connector for securing the at least one conduit to the pin and box flanges.

24. The bracket assembly of claim 23, wherein the pin and box flanges are removably connectable to the pin and box ends.

25. The bracket assembly of claim 23, wherein the pin and box flanges are affixed to the pin and box ends.

26. The bracket assembly of claim 23, wherein the pin and box flanges are removably connectable to the at least one wedge.

27. The bracket assembly of claim 23, wherein the at least one wedge is threadably connectable to the pin flange and the box flange.

28. The bracket assembly of claim 23, wherein the at least one wedge comprises an external wedge.

29. The bracket assembly of claim 23, wherein the box end has a plurality of fingers at an end thereof with slots therebetween, the plurality of fingers selectively extendable for placement about the pin end of the second of the plurality of tubulars.

30. The bracket assembly of claim 23, wherein the conduit is at least one of a choke, kill, hydraulics, riser fill up, electrical, and fluid.

31. The bracket assembly of claim 23, wherein the at least one wedge comprises an inner wedge and an outer wedge.

32. The bracket assembly of claim 31, wherein the outer wedge has a rim for receiving the box end.

33. A method of connecting a plurality of tubulars to form a tubular string for passage of fluid therethrough, the method comprising:
   providing adjacent tubulars of the plurality of tubulars with a tubular connection therebetween, the tubular connection comprising:
      a pin end located at an end of a first of the adjacent tubulars, the pin end having an outer locking surface; and
      a box end located at an end of a second of the adjacent tubulars, the box end having a plurality of fingers located at an end region thereof with slots positioned therebetween and an inner locking surface located on an inner surface thereof;
   inserting the pin end of the first of the adjacent tubulars in the box end of the second of the adjacent tubulars;
   securing at least one wedge about the plurality of fingers; and
   distributing the loads between the adjacent tubulars by cooperatively engaging the inner locking surface of the plurality of fingers of the box end with the outer locking surface of the pin end.

34. The method of claim 33, further comprising positioning a box flange about the box end of the adjacent tubulars.

35. The method of claim 33, further comprising selectively spreading the plurality of fingers.

36. The method of claim 35, further comprising closing the plurality of fingers about the pin end of the first of the plurality of tubulars.

37. The method of claim 33, further comprising positioning a pin flange about the pin end of the adjacent tubulars.

38. The method of claim 37, further comprising supporting at least one conduit with the pin flange and the box flange.

39. The method of claim 37, further comprising threadedly connecting the pin flange and the box flange with the at least one wedge.

40. The method of claim 37, wherein the at least one wedge comprises an inner wedge and outer wedge, the method further comprising positioning the inner wedge about the plurality of fingers and positioning the outer wedge about the inner wedge and receiving an end of the plurality of fingers in a rime of the outer wedge.

* * * * *